(No Model.)
5 Sheets—Sheet 1.

F. A. JONES.
RECORDING PRESSURE GAGE.

No. 340,581. Patented Apr. 27, 1886.

WITNESSES.
Joseph Ishbaugh.
J. M. Hartnett.

INVENTOR.
Florentine A. Jones
By his Atty.
Henry W. Williams

N. PETERS. Photo-Lithographer, Washington, D. C.

(No Model.) 5 Sheets—Sheet 2.

F. A. JONES.
RECORDING PRESSURE GAGE.

No. 340,581. Patented Apr. 27, 1886.

WITNESSES. INVENTOR.
Joseph Ishbaugh. Florentine A. Jones
J. M. Hartnett. By his Atty.
Henry W. Williams (No Model.) 5 Sheets—Sheet 3.
F. A. JONES.
RECORDING PRESSURE GAGE.

No. 340,581. Patented Apr. 27, 1886.

WITNESSES.
Joseph Ishbaugh.
J. M. Hartnett.

INVENTOR.
Florentine A. Jones
By his Atty.
Henry W. Williams (No Model.)  5 Sheets—Sheet 4.

F. A. JONES.
RECORDING PRESSURE GAGE.

No. 340,581.  Patented Apr. 27, 1886.

WITNESSES.
Joseph Ishbaugh.
J. M. Hartnett.

INVENTOR.
Florentine A. Jones,
By his Att'y.
Henry W. Williams (No Model.) 5 Sheets—Sheet 5.
F. A. JONES.
RECORDING PRESSURE GAGE.

No. 340,581. Patented Apr. 27, 1886.

WITNESSES. INVENTOR.
Joseph Ishbaugh. Florentine A. Jones,
J. M. Hartnett. By his Atty.
 Henry W. Williams

UNITED STATES PATENT OFFICE.

FLORENTINE A. JONES, OF MALDEN, MASSACHUSETTS.

RECORDING PRESSURE-GAGE.

SPECIFICATION forming part of Letters Patent No. 340,581, dated April 27, 1886.

Application filed February 23, 1884. Serial No. 121,674. (No model.)

*To all whom it may concern:*

Be it known that I, FLORENTINE A. JONES, of the city of Malden, in the county of Middlesex and State of Massachusetts, have invented new and useful Improvements in Recording Pressure-Gages, of which the following is a specification.

This invention relates to gages for showing the extent and variations of pressure in steam-boilers, cylinders, or other vessels containing air, gas, liquid, or other fluids; and it has for its object to increase or multiply the resultant movement caused by the spring in the gage-box by means of a device which shall be adapted to produce a record on a larger scale than has heretofore been done, and which will by its structure adapt itself to the space in a gage-box required for its working on the scale required.

Figure 1:
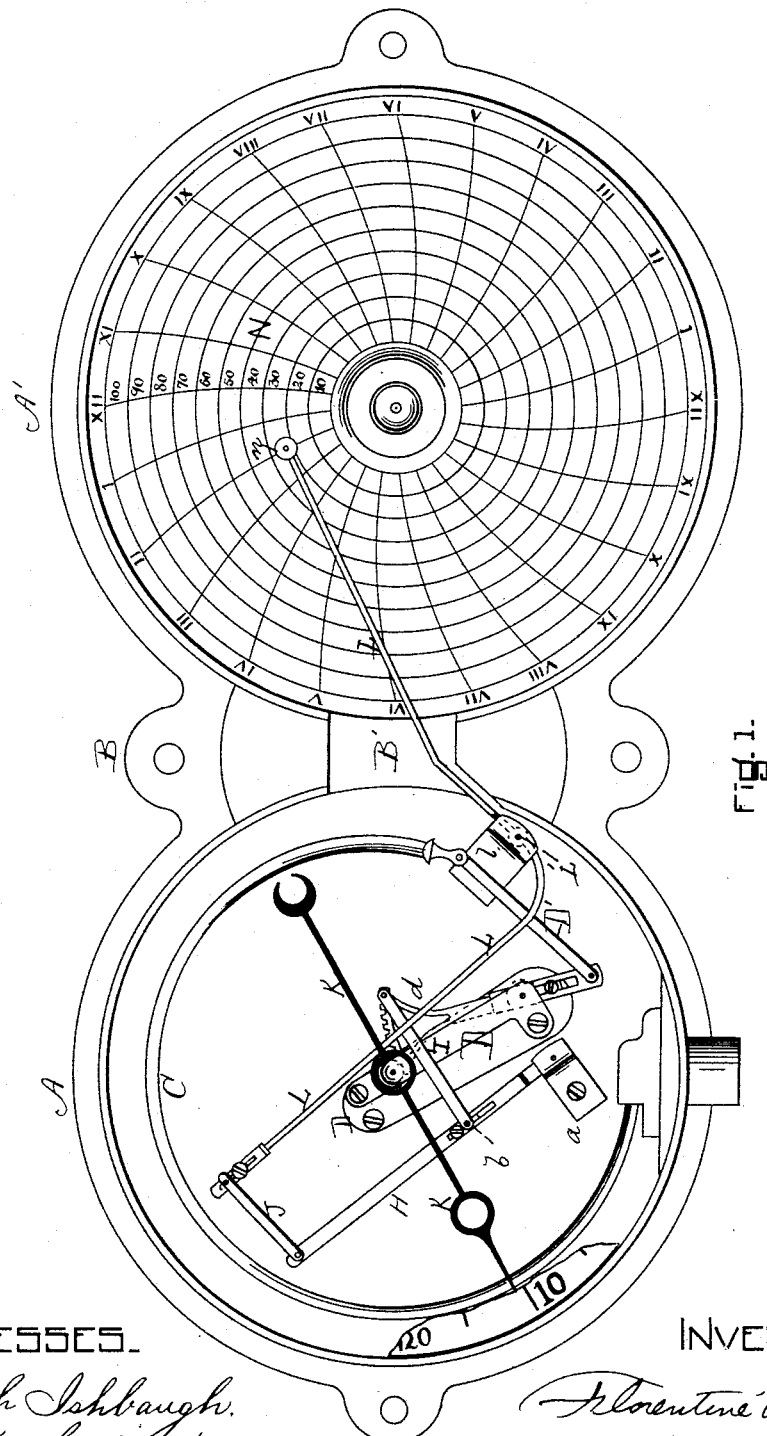
Figure 2:
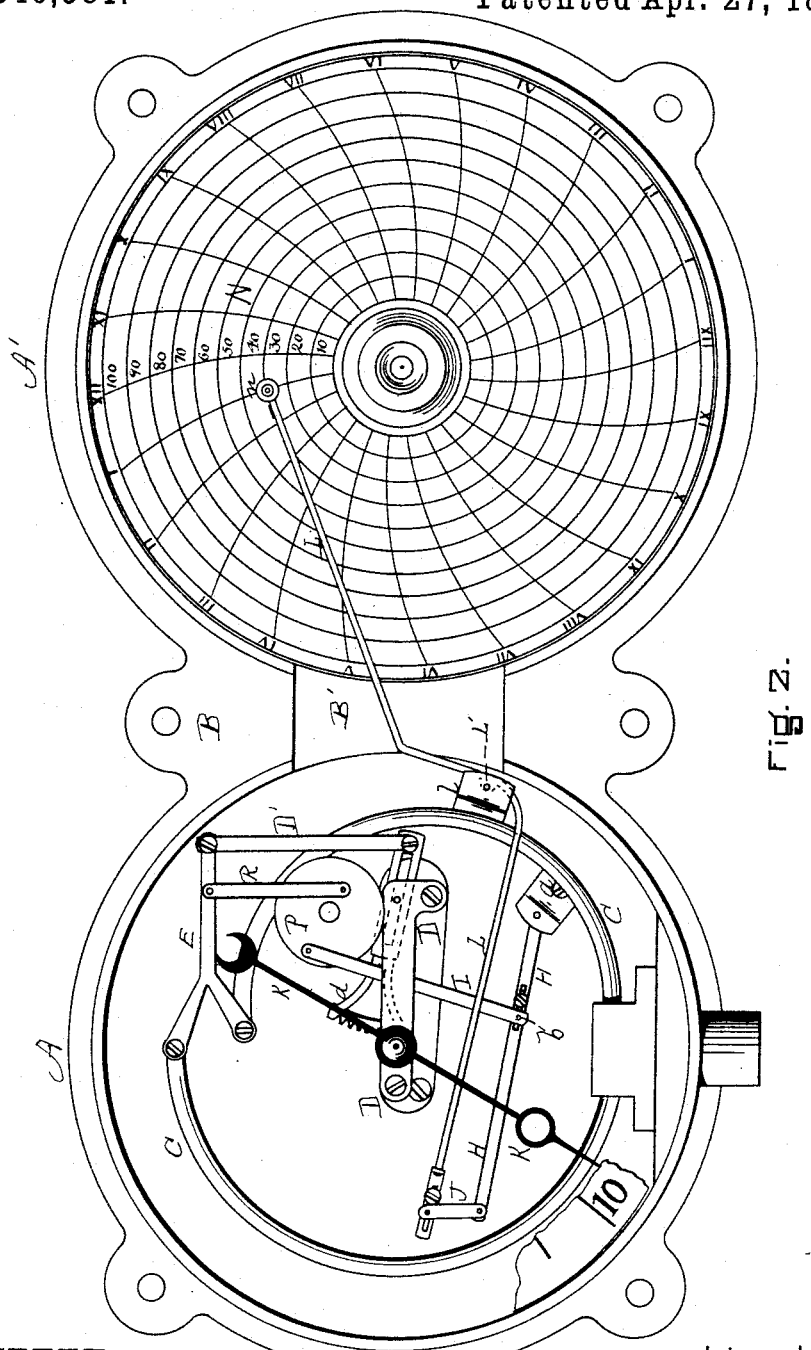
Figure 3:
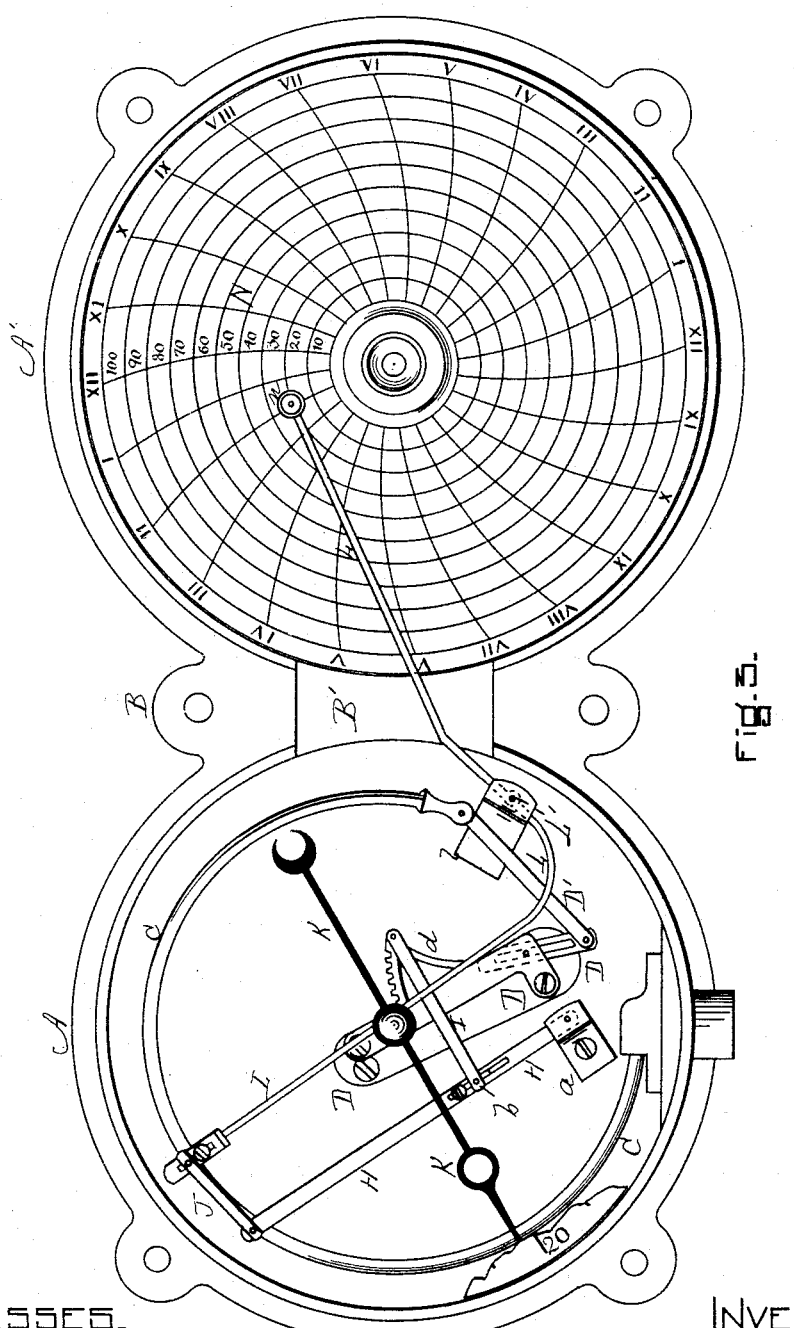
Figure 4:
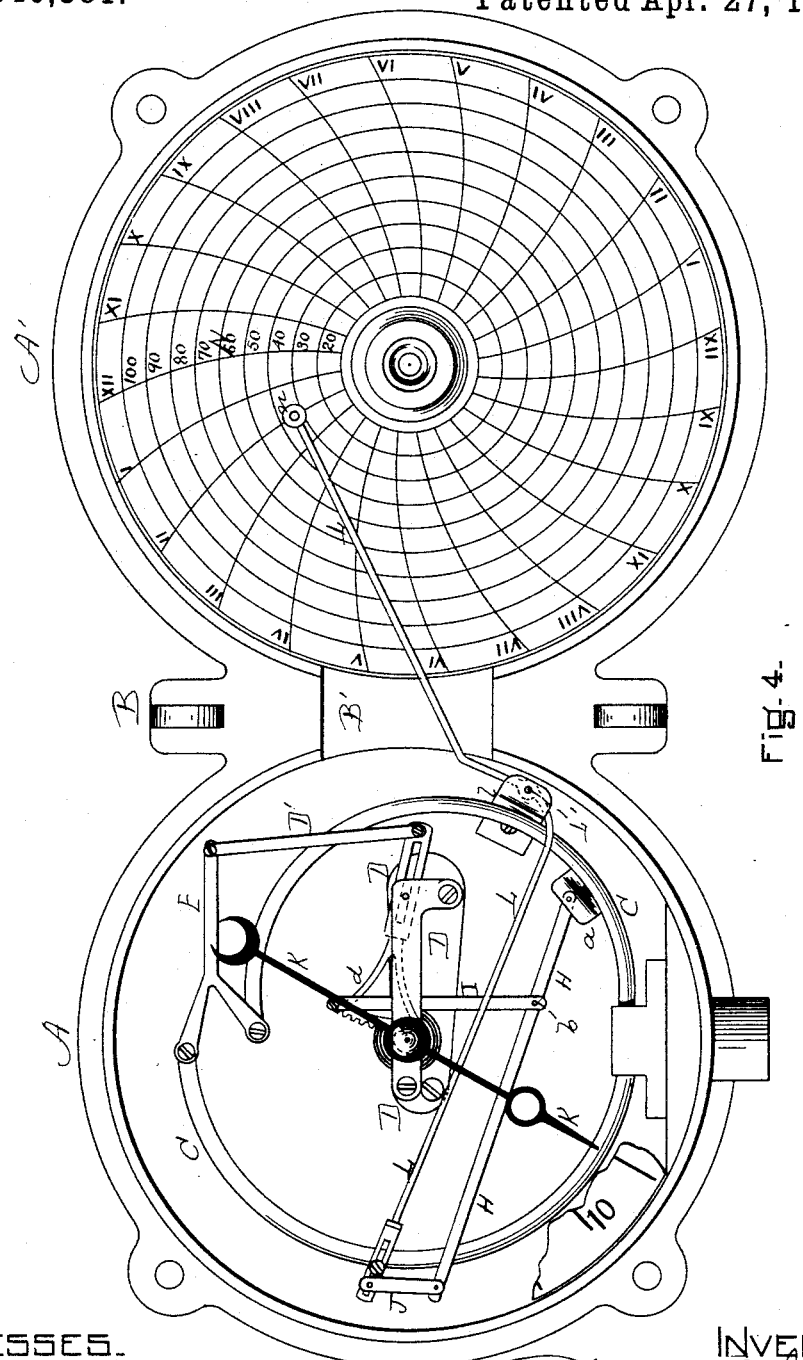
Figure 5:
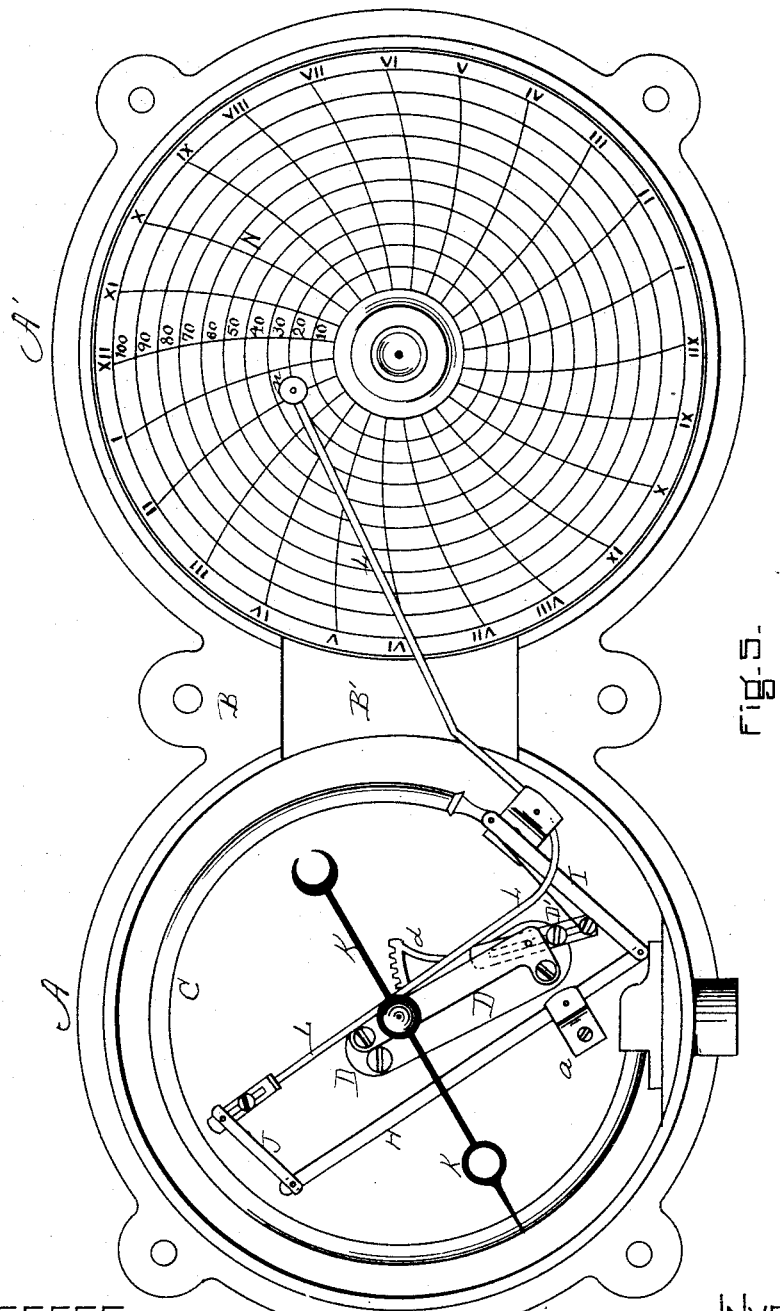

In the accompanying drawings, in which similar letters of reference indicate like parts, Figure 1 is a plan view of my improved recording pressure-gage with the dial of the gage-box substantially removed and a single Bourdon spring employed. Fig. 2 is a similar view showing the construction of my device when a double Bourdon spring is employed. Figs. 3 and 4 are similar views of modifications, said figures showing, respectively, a single and double Bourdon spring; and Fig. 5 is a similar view showing a modification in the manner of connecting the multiplying-lever with the Bourdon spring.

A and A' are boxes secured to each other by the connection B, which has a suitable passage, B', for the accommodation of the connecting mechanism.

C represents a Bourdon spring, single in Figs. 1 and 3 and double in Figs. 2 and 4; and D, the ordinary mechanism of a steam-gage, consisting, essentially, of a segmental rack, $d$, pivoted near its rear end, and meshing into a pinion carrying the pointer K. The pinion is not shown in the drawings, as this mechanism is common in "Bourdon" pressure-gages, so called.

D' is a link, which, when a single spring is used, connects the mechanism D therewith, and, when a double spring is used, connects said mechanism with the bifurcated projection E, rigidly secured to the ends of said springs, whereby movement is imparted to the pointer K, thus showing in connection with a dial the steam-pressure.

In Fig. 1, H is an independent lever, pivotally secured at one end to a suitable standard, $a$, attached to the box A, adjustably pivoted at $b$ by means of the link I to the rack $d$, and at its other end loosely connected by the link J to the rear end of the lever L, which is centrally pivoted at L' to a suitable support, $l$, and which imparts the movement to the delineating device $n$ at its opposite end, by which the pressure is recorded upon the dial N, constructed and rotated by a clock-movement in the ordinary manner. It will be observed that the lever L, being centrally pivoted, is not a multiplying-lever, but is connected with a multiplying-lever, H, which is intermediate with the delineating-lever L and the steam-gage mechanism D.

In Fig. 2, where a double Bourdon spring is illustrated, the independent multiplying-lever H and the delineating-lever L operate in the same manner; but the link I, instead of connecting the multiplying-lever directly to the rack $d$, connects it with a rotary disk, P, at a point near its periphery, which disk is connected at a point near its center by a link, R, to the bifurcated projection E, rigidly secured to the ends of the spring. Thus the disk is in reality a multiplying-lever and performs the functions of one.

The modification shown in Fig. 3 illustrates a gage with a single Bourdon spring, and is exactly like that shown in Fig. 1, except that the pivotal point L' of the lever L is not central, there being a greater length of lever between said pivotal point and the point of connection with the link J than between the pivotal point and the delineating device $n$; hence this lever L, whether centrally pivoted as in Figs. 1 and 2 or pivoted as in Fig. 3, is not a multiplying-lever.

The multiplying-lever H in Fig. 3 is lengthened to correspond with the lever L.

The modification shown in Fig. 4 shows a gage with a double Bourdon spring, with the lever H elongated at the rear of its pivotal point, as in Fig. 3, and connected directly with the segmental rack $d$, as in Fig. 1.

The modification shown in Fig. 5 exhibits a gage having a single Bourdon spring, with the lever H extended beyond the pivotal point in the support a, and the link I connecting said lever H near its end to the Bourdon spring.

In operation the manner of making the record is as follows: Steam or fluid enters the hollow tube C through a suitable hollow plug, to which the spring is connected at its base, and the pressure acting on the inner surface of the tube causes it to expand or contract as the pressure is greater or less, and this movement is communicated by means of the intermediate mechanism to the swinging rod L, which causes the delineating device n to rise and fall with the pressure, and thus records the pressure upon the dial N or any suitable recording-surface.

Having thus fully described my invention, what I claim, and desire to secure by Letters Patent, is—

1. In a recording pressure-gage, the combination of the following elements, viz: a Bourdon spring or springs and suitable connecting mechanism, a non-multiplying lever operating a device for recording the extent and variations of pressure, and an independent multiplying-lever intermediate with the said delineating-lever and the said spring or springs, substantially as and for the purpose set forth.

2. In a recording pressure-gage, the combination, with the Bourdon spring or springs provided with suitable connecting mechanism, a delineating-lever, whereby the extent and variations of pressure may be recorded, and an independent multiplying-lever intermediate with the said delineating-lever and the said springs, of an independent lever intermediate with said multiplying-lever and said springs, and provided with suitable connections with both, substantially as and for the purpose described.

FLORENTINE A. JONES.

Witnesses:
HENRY W. WILLIAMS,
JOSEPH ISHBAUGH.